United States Patent
Hsu et al.

(10) Patent No.: US 8,034,492 B2
(45) Date of Patent: Oct. 11, 2011

(54) FUEL CELL APPARATUS

(75) Inventors: Nien-Hui Hsu, Hsinchu (TW); Cheng Wang, Hsinchu (TW); Ching-Po Lee, Hsinchu (TW); Jin-Shu Huang, Hsinchu (TW)

(73) Assignee: Young Green Energy Co., Hsinchu County (TW)

(*) Notice: Subject to any disclaimer, the term of this patent is extended or adjusted under 35 U.S.C. 154(b) by 1007 days.

(21) Appl. No.: 11/923,639

(22) Filed: Oct. 24, 2007

(65) Prior Publication Data

US 2008/0286623 A1 Nov. 20, 2008

(30) Foreign Application Priority Data

May 16, 2007 (TW) .............................. 96117437 A

(51) Int. Cl.
*H01M 8/22* (2006.01)
(52) U.S. Cl. ........ 429/407; 429/408; 429/413; 429/414; 429/439
(58) Field of Classification Search .................. 429/407, 429/408, 413, 414, 439, 468
See application file for complete search history.

(56) References Cited

U.S. PATENT DOCUMENTS

| | | | | |
|---|---|---|---|---|
| 4,315,893 A * | 2/1982 | McCallister | ............... | 422/109 |
| 2002/0011327 A1 * | 1/2002 | Fukazu et al. | ............... | 165/80.4 |
| 2007/0122670 A1 * | 5/2007 | Goto | ............... | 429/26 |
| 2008/0107944 A1 * | 5/2008 | Goebel | ............... | 429/26 |

FOREIGN PATENT DOCUMENTS

| | | |
|---|---|---|
| CN | 1778009 | 5/2006 |
| TW | 200511636 | 3/2005 |

OTHER PUBLICATIONS

"1st Office Action of China counterpart application", issued on Jul. 31, 2009, p. 1-p. 4.
"Notice of Allowance of Taiwan Counterpart Application", issued on Feb. 21, 2011, p. 1-p. 3, in which the listed reference was cited.

* cited by examiner

*Primary Examiner* — Patrick Joseph Ryan
*Assistant Examiner* — Ben Lewis
(74) *Attorney, Agent, or Firm* — Jianq Chyun IP Office

(57) ABSTRACT

A fuel cell apparatus including a fuel cell module, a heat exchanging assembly, and an airflow producing element is provided. The fuel cell module is used to perform chemical reactions of a fuel cell. The heat exchanging assembly includes a first heat exchanging part, a second heat exchanging part, and a connection part. The connection part connects the first heat exchanging part and the second heat exchanging part respectively. The airflow producing element is adapted to produce an airflow, and the airflow flows through the first heat exchanging part, the fuel cell module, and the second heat exchanging part sequentially.

14 Claims, 4 Drawing Sheets

FUEL CELL APPARATUS

CROSS-REFERENCE TO RELATED APPLICATION

This application claims the priority benefit of Taiwan application serial no. 96117437, filed on May 16, 2007. All disclosure of the Taiwan application is incorporated herein by reference.

BACKGROUND OF THE INVENTION

1. Field of the Invention

The present invention relates to a cell. More particularly, the present invention relates to a fuel cell apparatus.

2. Description of Related Art

The fuel cell, advantageous in high efficiency, low noise, and pollution free, has become an energy technology in conformity with the trend of this era. The fuel cell has various types, including a proton exchange membrane fuel cell (PEMFC) and a direct methanol fuel cell (DMFC) which are commonly seen in the market. For example, the fuel cell module of the DMFC includes a proton exchange membrane and a cathode and an anode respectively disposed at two sides of the exchange membrane.

The DMFC uses methanol solution as the fuel, and the reaction formulas of the DMFC are given as follows:

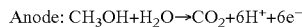

Anode: $CH_3OH + H_2O \rightarrow CO_2 + 6H^+ + 6e^-$

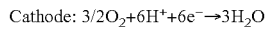

Cathode: $3/2O_2 + 6H^+ + 6e^- \rightarrow 3H_2O$

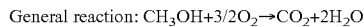

General reaction: $CH_3OH + 3/2O_2 \rightarrow CO_2 + 2H_2O$

It can be seen from the above reaction formulas, enough oxygen ($O_2$) must be supplied to the cathode during the reactions of the DMFC. Moreover, the higher the temperature of reaction is, the higher the reaction efficiency is.

FIG. 1 is a schematic view of a conventional fuel cell apparatus. Referring to FIG. 1, the conventional fuel cell apparatus 100 includes a fan 110 and a fuel cell module 120. The fan 110 is used to generate an airflow 50 to the fuel cell module 120 so as to supply the oxygen required by the cathode reaction. Moreover, a heat energy Q is generated during the reaction of the fuel cell module 120. If the temperature of the airflow 50 before flowing into the fuel cell module 120 is $T_A$, the temperature of the airflow 50 after flowing through the fuel cell module 120 rises up to $T_B$, where $T_B$-$T_A$ is in direct proportion to Q.

However, since the temperature of the airflow 50 produced by the fan 110 is lower than that of the fuel cell module 120, when the airflow 50 flows to the fuel cell module 120, the temperature of the fuel cell module 120 is decreased. As such, the reaction efficiency of the fuel cell module 120 decreases, which further reduce the performance of the fuel cell apparatus 100. Moreover, since the lift of the fan 110 is low, the airflow 50 does not easily take the water produced in the cathode reaction away from the fuel cell module 120. Therefore, the water produced in the cathode reaction is usually vaporized into water vapor first, and then departs from the fuel cell module 120 with the airflow 50. However, the airflow 50 having a low temperature has a low saturated water vapor pressure, making it difficult to vaporize water.

Moreover, the water vapor of the conventional fuel cell apparatus 100 is discharged to the outside, thus the water cannot be recycled. Moreover, since the airflow 50 produced by the fan 110 has a lower temperature, the water vapor is liable to be condensed on the surface of the cathode of the fuel cell module 120, thus obstructing the flow field. Therefore, the oxygen is not supplied to the cathode easily, and the performance of the fuel cell apparatus 100 is thus deteriorated.

SUMMARY OF THE INVENTION

The present invention provides a fuel cell apparatus to improve the conventional art.

A fuel cell apparatus including a fuel cell module, a heat exchanging assembly, and an airflow producing element is provided in an embodiment of the present invention. The fuel cell module is used to perform chemical reactions of a fuel cell. The heat exchanging assembly includes a first heat exchanging part, a second heat exchanging part, and a connection part. The connection part connects the first heat exchanging part and the second heat exchanging part respectively. The airflow producing element is adapted to produce an airflow, and the airflow flows through the first heat exchanging part, the fuel cell module, and the second heat exchanging part sequentially.

Since the high-temperature airflow flowing through the fuel cell module flows through the second heat exchanging part of the heat exchanging assembly, the temperature of the heat exchanging assembly rises. Therefore, when the airflow flows through the first heat exchanging part of the heat exchanging assembly, the temperature of the airflow rises. Compared with the conventional art, since the temperature of the airflow flowing to the fuel cell module is higher, the performance of the fuel cell apparatus is improved.

In order to make the aforementioned and other objectives, features and advantages of the present invention comprehensible, preferred embodiments accompanied with figures are described in detail below.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
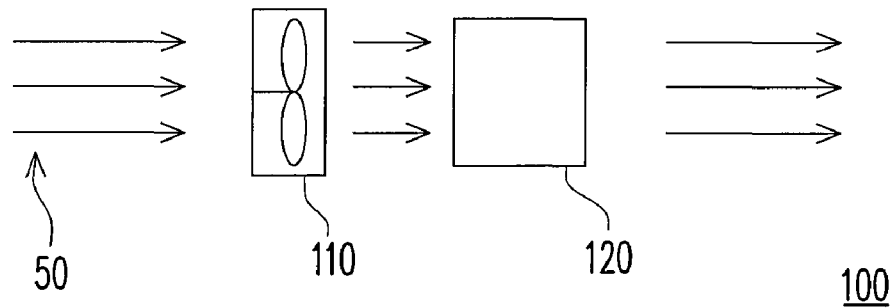
FIG. 1 is a schematic view of a conventional fuel cell apparatus.
Figure 2:
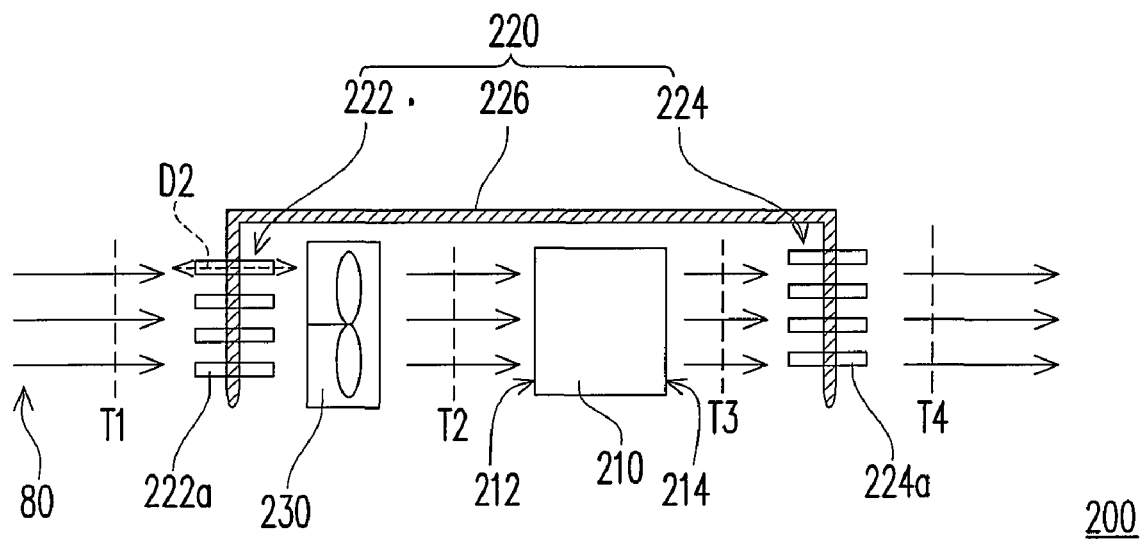
FIG. 2 is a schematic view of a fuel cell apparatus according to an embodiment of the present invention.

FIG. 2 is a schematic view of a fuel cell apparatus according to an embodiment of the present invention. Referring to FIG. 2, the fuel cell apparatus 200 of this embodiment includes a fuel cell module 210, a heat exchanging assembly 220, and an airflow producing element 230. The fuel cell module 210 is used to perform chemical reactions of a fuel cell, and has an air inlet end 212 and an air outlet end 214 opposite to the air inlet end 212. The heat exchanging assembly 220 includes a first heat exchanging part 222 (heating end), a second heat exchanging part 224 (condensing end), and a connection part 226. The first heat exchanging part 222 is disposed beside the air inlet end 212, and the position of the first heat exchanging part 222 corresponds to the position of the air inlet end 212. The second heat exchanging part 224 is disposed beside the air outlet end 214, and the position of the second heat exchanging part 224 corresponds to the position of the air outlet end 214. The connection part 226 connects the first heat exchanging part 222 and the second heat exchanging part 224 respectively. The airflow producing element 230 produces an airflow 80, and the airflow 80 sequentially flows through first heat exchanging part 222, enters into the fuel cell module 210 from the air inlet end 212 of the fuel cell module 210, departs the fuel cell module 210 from the air outlet end 214 of the fuel cell module 210, and flows through the second heat exchanging part 224.

In the above fuel cell apparatus 200, the airflow producing element 230 is, for example, a fan. Moreover, although the airflow producing element 230 in FIG. 2 is disposed between the first heat exchanging part 222 and the fuel cell module 210, the airflow producing element 230 may be also disposed at a side of the first heat exchanging part 222 far away from the fuel cell module 210, between the fuel cell module 210 and the second heat exchanging part 224, or at a side of the second heat exchanging part 224 far away from the fuel cell module 210.

On the basis of the above description, the connection part 226 is, for example, a heat pipe 226 having a high thermal conductivity coefficient. For example, the thermal conductivity coefficient of the connection part 226 is larger than 1000 W/mK. Moreover, the first heat exchanging part 222 and the second heat exchanging part 224 are respectively a plurality of fins 222a and 224a for improving the heat exchanging capability. Each of the fins 222a and 224a extends in a direction D2 substantially parallel to the flowing direction of the airflow 80, and each of the fins 222a and 224a is substantially orthogonally connected to the connection part 226. The fins 222a and 224a may be made of a material having a high thermal conductivity coefficient, and the fins 222a and 224a has flow guide function for reducing the flow resistance. The heat pipe 220 of the heat exchanging assembly 220 may be made of a copper pipe, and the fins 222a and 224a may be made of copper, aluminum, stainless steel, or graphite.

In this embodiment, an heat energy Q is produced during the reactions of the fuel cell of the fuel cell module 210. If the temperature of the airflow 80 flowing into the air inlet end 212 of the fuel cell module 210 is $T_2$, the temperature of the airflow 80 flowing out of the air outlet end 214 of the fuel cell module 210 rises up to $T_3$, where $T_3-T_2$ is in direct proportion to Q. In other words, the airflow 80 takes away a part of the energy Q. Moreover, when the airflow 80 flows to the second heat exchanging part 224 of the heat exchanging assembly 220, the airflow 80 exchanges heat with the second heat exchanging part 224. In order words, a part of the energy taken away by the airflow 80 enters the heat exchanging assembly 220.

Figure 3:
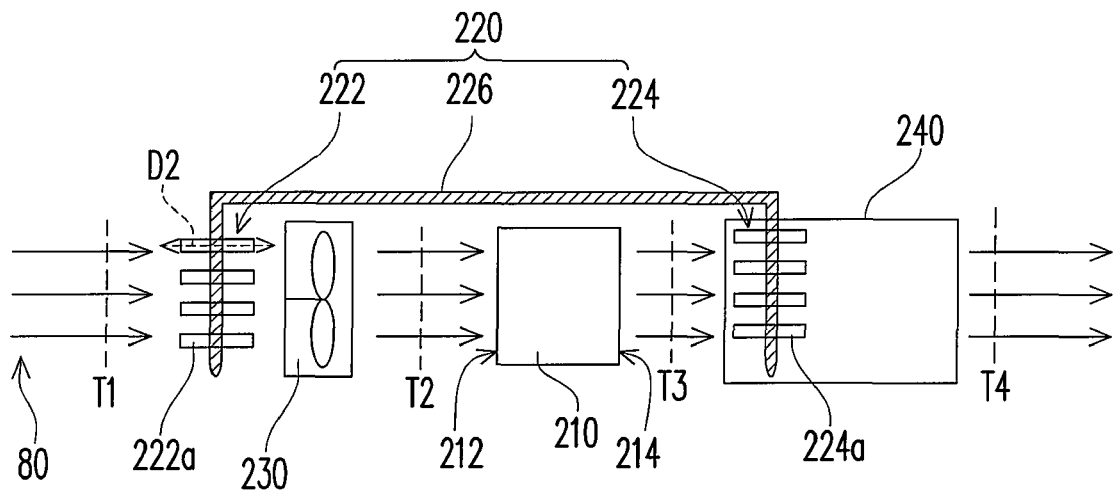
FIG. 3 is a schematic view of a fuel cell apparatus according to another embodiment of the present invention.

On the basis of the above description, the temperature of the airflow 80 after flowing through the second heat exchanging part 224 of the heat exchanging assembly 220 decreases from $T_3$ to $T_4$. Moreover, when the airflow 80 flows through the fuel cell module 210, the water produced in the cathode reaction is vaporized into water vapor, and the water vapor flows out of the fuel cell module 210 with the airflow 80. Therefore, when the temperature of the airflow 80 decreases from $T_3$ to $T_4$, the saturated water vapor pressure of the water vapor decreases, and thus a part of the water vapor in the airflow 80 is condensed into water. Therefore, in this embodiment, the fuel cell apparatus 200 further includes a tank 240 (as shown in FIG. 3) disposed at a position corresponding to the position of the second heat exchanging part 224, such that the condensed water drops into the tank 240, so that the water is recycled. For example, the second heat exchanging part 224 extends into the tank 240 (as shown in FIG. 3) or is placed above an opening of the tank, or the tank is disposed in an area near the second heat exchanging part 224, and a pipe is used to guide the water into the tank.

In another aspect, since the heat exchanging assembly 220 has a high thermal conductivity coefficient, the heat energy that enters the second heat exchanging part 224 of the heat exchanging assembly 220 is transmitted to the first heat exchanging part 222 through the connection part 226. Therefore, when the airflow 80 flows through the first heat exchanging part 222, the temperature of the airflow 80 rises from $T_1$ to $T_2$, and then the airflow 80 flows to the fuel cell module 210. Compared with the conventional art, in the fuel cell apparatus 200 of this embodiment, the airflow 80 of the fuel cell module 210 has a higher temperature, and thus the reaction efficiency of the fuel cell module 210 is increased, which further improves the performance of the fuel cell apparatus 200.

Moreover, since the airflow 80 flowing to the fuel cell module 210 has a higher temperature, the saturated water vapor pressure is high, thus the ratio of vaporizing the water produced in the cathode reaction into water vapor is increased, so as to improve the efficiency of removing water at the cathode. Moreover, compared with the conventional art, the airflow 80 flowing to the fuel cell module 210 has a higher temperature, so the water vapor is not easily condensed on the surface of the cathode of the fuel cell module 210. As such, the flow field is not obstructed by water, and the oxygen is supplied to the cathode successfully, which further improves the performance of the fuel cell apparatus 200.

Figure 4:
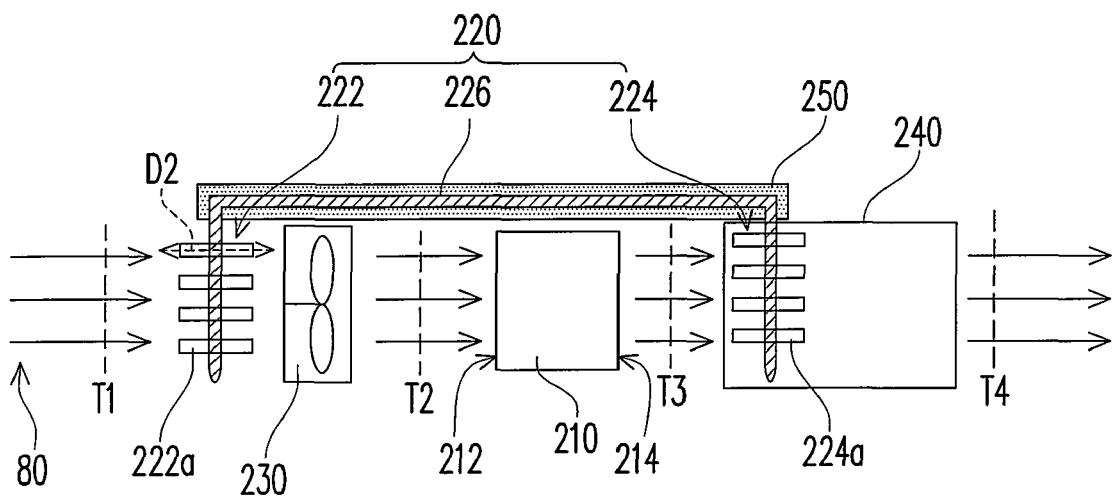
FIG. 4 is a schematic view of a fuel cell apparatus according to another embodiment of the present invention.

In order to reduce the heat loss, a heat insulating element 250 (as shown in FIG. 4) surrounds the connection part 226 of the heat exchanging assembly 220 in a range between the first heat exchanging part 222 and the second heat exchanging part 224. The heat insulating element 250 may be made of a material such as foam having a low thermal conductivity coefficient, but is not limited to this. After the airflow 80 flows through the fuel cell module 210, a small amount of methanol contained in the water vapor taken away by the airflow 80 erodes the connection part 226 and the fins 222*a* and 224*a*, so a surface of the heat exchanging assembly 220 placed in the flow field after the airflow 80 flows through the fuel cell module 210 is an anti-chemical-corrosion layer. In specific, after the airflow 80 flows out of the fuel cell module 210, the section of the connection part 226 and the fins 224*a* in contact with the airflow 80 is made of an anti-methanol-corrosion material or plated with an anti-methanol-corrosion material, so as to prevent corrosion. For example, the anti-methanol-corrosion material is a carbon tetrafluoride (CF4).

Figure 5:
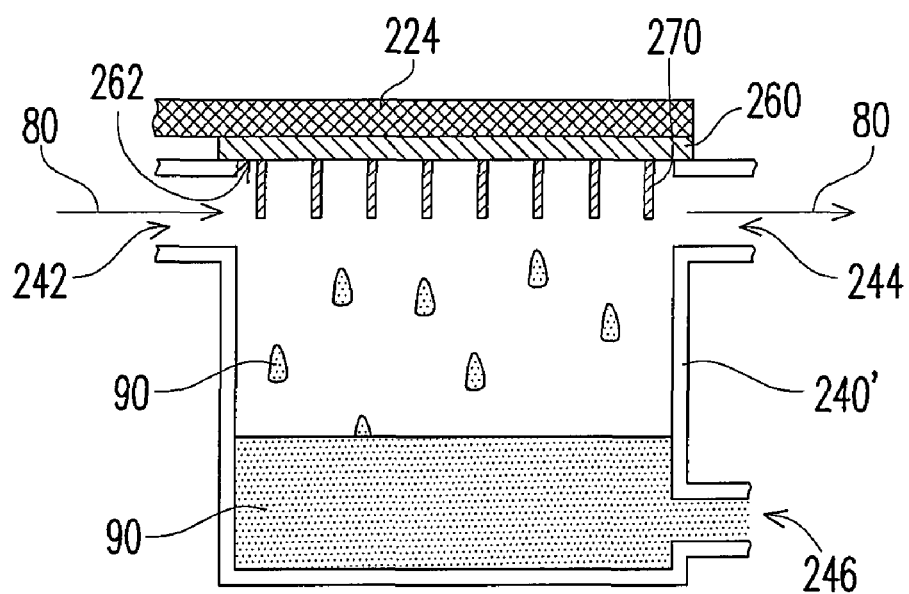
FIG. 5 is a schematic partial view of a fuel cell apparatus according to another embodiment of the present invention.

FIG. 5 is a schematic partial view of a fuel cell apparatus according to another embodiment of the present invention. Referring to FIG. 5, in this embodiment, the tank 240' disposed below the second heat exchanging part 224 has a first input port 242, a first output port 244, and a second output port 246. The first input port 242 and the first output port 244 are placed at an upper portion of the tank 240', and the second output port 246 is placed at a lower portion of the tank 240'. Moreover, an upper lid 260 covering the tank 240' is disposed above the tank 240', the upper lid 260 is a part of the connection part 226, the second heat exchanging part 224 of the heat exchanging assembly 220 is connected to the upper lid 260 and is placed in the tank 240'. That is to say, the fins 270 are disposed on the bottom 262 of the upper lid 260. The upper lid 260 and the fins 270 are made of a material such as copper, aluminum, stainless steel, or other metals having a high thermal conductivity coefficient.

In this embodiment, the airflow 80 flowing through the fuel cell module enters the tank 240' from the first input port 242, exchanges heat with the fins 270 and the upper lid 260, and then flows out of the tank 240' from the first output port 244. After the airflow 80 exchanges heat with the fins 270 and the upper lid 260, the heat that enters the fins 270 and the upper lid 260 is transmitted to the heat exchanging assembly 220, and a part of the water vapor is condensed into water 90, and drops into the tank 240'. The upper lid 260 disposed above the tank 240' prevents the water from being vaporized to the outside, thus the efficiency of water recycling is further improved.

Moreover, the second output port 246 at the lower portion of the tank 240' is connected to a mixing tank (not shown), such that the water 90 in the tank 240' flows into the mixing tank to be mixed with the fuel in the mixing tank.

Figure 6:
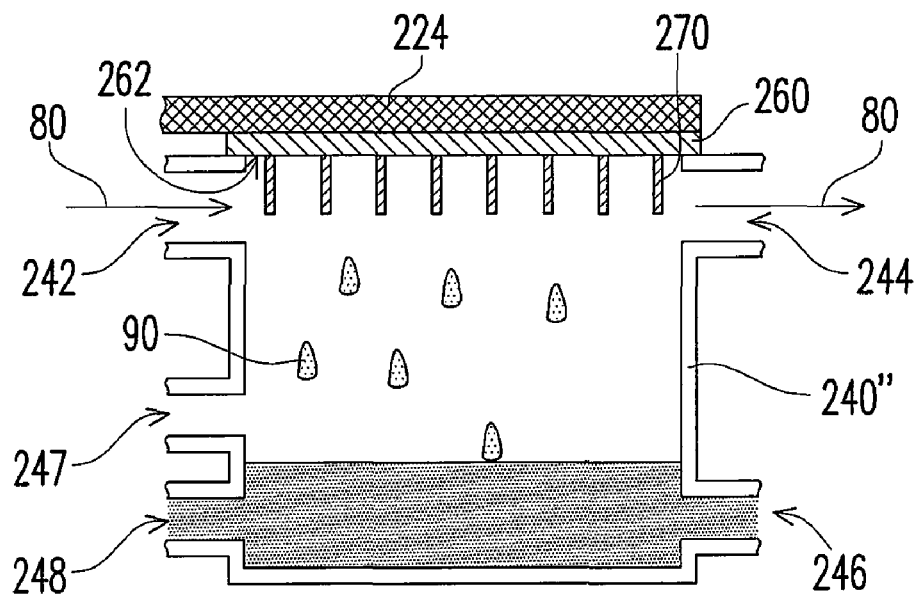
FIG. 6 is a schematic partial view of a fuel cell apparatus according to another embodiment of the present invention.

FIG. 6 is a schematic partial view of a fuel cell apparatus according to another embodiment of the present invention. FIG. 6 is similar to FIG. 5, except that the tank 240" in FIG. 6 is a mixing tank. In specific, the tank 240" further has a second input port 247 and a third input port 248. The low-concentration fuel coming from the anode of the fuel cell module 210 is input into the tank 240" from the second input port 247, and the high-concentration fuel coming from a fuel tank is input into the tank 240" from the third input port 248. Moreover, the first output port 246 is connected to the anode of the fuel cell module 210, such that the fuel in the tank 240" flows to the anode of the fuel cell module 210.

Figure 7:
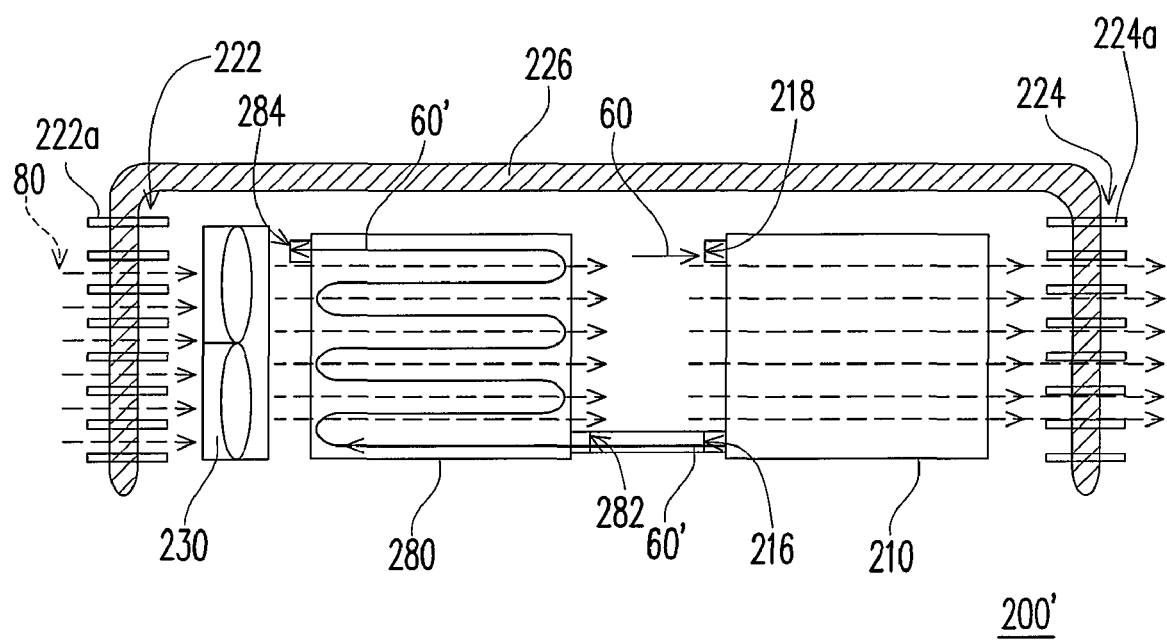
FIG. 7 is a schematic view of a fuel cell apparatus according to another embodiment of the present invention.

FIG. 7 is a schematic view of a fuel cell apparatus according to another embodiment of the present invention. Referring to FIG. 7, the fuel cell apparatus 200' of this embodiment is similar to the fuel cell apparatus 200 in FIG. 2, except that the fuel cell apparatus 200' further includes a heat exchanging flow field plate 280. The heat exchanging flow field plate 280 is disposed between the first heat exchanging part 222 of the heat exchanging assembly 220 and the fuel cell module 210 and placed in the flow field of the airflow 80. The heat exchanging flow field plate 280 is made of a material having a high thermal conductivity coefficient. Moreover, the heat exchanging flow field plate 280 has a first fuel input port 282 and a first fuel output port 284. The first fuel input port 282 is connected to a second fuel output port 216 of the fuel cell module 210, and the first fuel output port 284 is connected to a tank (tank 240" in FIG. 6) of the fuel cell apparatus 200'.

On the basis of the above description, the fuel cell module 210 further has a second fuel input port 218, and the fuel 60 for the anode reaction is input into the fuel cell module 210 through the second fuel input port 218. The fuel 60' after reaction is input into the heat exchanging flow field plate 280 through the second fuel output port 216 and the first fuel input port 282, and output to the tank through the first fuel output port 284 of the heat exchanging flow field plate 280.

Since the fuel 60' after reaction has a higher temperature, the fuel 60' when flowing in the heat exchanging flow field plate 280 exchanges heat with the heat exchanging flow field plate 280, so as to transmit heat into the heat exchanging flow field plate 280. Therefore, when the airflow 80 flows through the heat exchanging flow field plate 280, the temperature of the airflow 80 is increased again. In other words, the airflow 80 flowing to the fuel cell module 210 has a higher temperature, and the reaction efficiency of the fuel cell module 210 is improved, thereby improving the performance of the fuel cell apparatus 200'.

On the basis of the above, the fuel cell apparatus according to the embodiments of the present invention has at least one or a part of or all of the following advantages.

1. After the airflow 80 flows through the second heat exchanging part 224 of the heat exchanging assembly 220, the temperature of the airflow 80 decreases. Thus, the saturated water vapor pressure of the water vapor is reduced, resulting in that a part of the water vapor in the airflow 80 is condensed into water, so that the water is recycled.

2. Since the heat that enters the second heat exchanging part 224 of the heat exchanging assembly 220 is transmitted to the first heat exchanging part 222, when the airflow 80 flows through the first heat exchanging part 222 of the heat exchanging assembly 220, the temperature of the airflow 80 rises. Since the airflow 80 flowing to the fuel cell module 210 has a higher temperature, the performance of the fuel cell apparatus 200 is improved.

3. A heat exchanging flow field plate 280 is disposed between the first heat exchanging part 222 of the heat exchanging assembly 220 and the fuel cell module 210 for utilizing the high-temperature fuel after reaction to increase the temperature of the airflow 80 effectively, thereby further improving the performance of the fuel cell apparatus 200.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A fuel cell apparatus, comprising:
    a fuel cell module, for performing chemical reactions of a fuel cell;
    a heat exchanging assembly, comprising a first heat exchanging part, a second heat exchanging part, and a connection part, wherein the connection part connects the first heat exchanging part and the second heat exchanging part respectively; and
    an airflow producing element, adapted to produce an airflow, wherein the airflow flows through the first heat exchanging part, the fuel cell module, and the second heat exchanging part sequentially, wherein the airflow enters the fuel cell module from an air inlet end of the fuel cell module, departs the fuel cell module from an air outlet end of the fuel cell module, the position of the first heat exchanging part corresponds to the position of the air inlet end, and the position of the second heat exchanging part corresponds to the position of the air outlet end.

2. The fuel cell apparatus as claimed in claim 1, wherein the first heat exchanging part and the second heat exchanging part are a plurality of fins respectively.

3. The fuel cell apparatus as claimed in claim 2, wherein each of the fins extends in a direction substantially parallel to a flowing direction of the airflow.

4. The fuel cell apparatus as claimed in claim 2, wherein the connection part is a heat pipe.

5. The fuel cell apparatus as claimed in claim 3, wherein the connection part is substantially orthogonally connected to each of the fins.

6. The fuel cell apparatus as claimed in claim 1, wherein the airflow producing element is disposed at a side of the first heat exchanging part.

7. The fuel cell apparatus as claimed in claim 1, wherein the airflow producing element is a fan.

8. The fuel cell apparatus as claimed in claim 1, further comprising a tank disposed at a position corresponding to the second heat exchanging part.

9. The fuel cell apparatus as claimed in claim 8, wherein the connection part comprises an upper lid covering the tank, and the second heat exchanging part is connected to the upper lid and is placed in the tank.

10. The fuel cell apparatus as claimed in claim 9, wherein a material of the upper lid is metal.

11. The fuel cell apparatus as claimed in claim 10, wherein the second heat exchanging part is a plurality of fins.

12. The fuel cell apparatus as claimed in claim 1, wherein the heat exchanging assembly further comprises a heat insulating element surrounding the connection part.

13. The fuel cell apparatus as claimed in claim 1, further comprising:
    a heat exchanging flow field plate, having a fuel input port and a first fuel output port, wherein the fuel input port is connected to a second fuel output port of the fuel cell module; and
    a tank, connected to the first fuel output port 14. The fuel cell apparatus as claimed in claim 1, wherein the surface of the heat exchanging assembly placed in a flow field after the airflow flows through the fuel cell module is an anti-chemical-corrosion layer.

* * * * *